(12) United States Patent
Liddell et al.

(10) Patent No.: US 11,042,564 B1
(45) Date of Patent: Jun. 22, 2021

(54) TRANSACTION ASSOCIATIONS IN WAVEFORM DISPLAYS

(71) Applicant: Xilinx, Inc., San Jose, CA (US)

(72) Inventors: David K. Liddell, Longmont, CO (US); Roger Ng, Campbell, CA (US); Kumar Deepak, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 226 days.

(21) Appl. No.: 16/145,013

(22) Filed: Sep. 27, 2018

(51) Int. Cl.
| | |
|---|---|
| *G06F 16/26* | (2019.01) |
| *G06T 11/20* | (2006.01) |
| *G06F 9/46* | (2006.01) |
| *G06F 16/248* | (2019.01) |
| *G06F 16/23* | (2019.01) |
| *G06F 3/0484* | (2013.01) |
| *G06T 11/60* | (2006.01) |

(52) U.S. Cl.
CPC ............ *G06F 16/26* (2019.01); *G06F 9/466* (2013.01); *G06F 16/2379* (2019.01); *G06F 16/248* (2019.01); *G06T 11/206* (2013.01); *G06F 3/04842* (2013.01); *G06T 11/60* (2013.01); *G06T 2200/24* (2013.01)

(58) Field of Classification Search
CPC .. G06F 16/2465; G06F 16/27; G06F 16/2308; G06F 16/273; G06F 16/951
See application file for complete search history.

(56) References Cited

U.S. PATENT DOCUMENTS

| | | | | |
|---|---|---|---|---|
| 5,704,289 A | * | 1/1998 | Bolza-Schunemann | B41F 27/1281 101/382.1 |
| 6,163,763 A | * | 12/2000 | Cox | G06F 11/0769 703/14 |
| 6,263,301 B1 | * | 7/2001 | Cox | G06F 30/33 703/14 |
| 9,502,086 B1 | * | 11/2016 | Simon | G11C 7/22 |
| 9,678,150 B2 | * | 6/2017 | Schelle | G06F 30/33 |

(Continued)

FOREIGN PATENT DOCUMENTS

EP 2915114 * 9/2015

OTHER PUBLICATIONS

Object Discrimination with an Artificial Hand using electrical Stimulation of Peripheral Tactile and Proprioceptive pathways with intrafascicular elctrodes, Kenneth Horch et cl.; IEEE, Oct. 2011.*

*Primary Examiner* — Daniel A Kuddus
(74) *Attorney, Agent, or Firm* — Kevin T. Cuenot (57) ABSTRACT

Methods, systems, and apparatus, including computer programs encoded on computer storage media, for generating transaction associations in a waveform display. One of the methods includes receiving data representing a main signal for a selected transaction in a waveform display, the main signal including a plurality of main signal events. A search is performed for data representing one or more side signals associated with the main signal for the selected transaction, each side signal including a plurality of side signal events representing other transactions that are associated with the main signal at a time indicated by a corresponding main signal event. A visual indication is generated within the waveform display of an association between the selected transaction and one or more transactions identified by the one or more side signals associated with the main signal for the selected transaction.

20 Claims, 9 Drawing Sheets

(56) References Cited

U.S. PATENT DOCUMENTS

| | | | |
|---|---|---|---|
| 2005/0121666 A1* | 6/2005 | Kondakova | H01L 51/5016 257/40 |
| 2005/0273474 A1* | 12/2005 | Kawamura | G06F 11/2097 |
| 2010/0311482 A1* | 12/2010 | Lange | A61B 5/117 463/1 |
| 2012/0095819 A1* | 4/2012 | Li | G06Q 30/02 705/14.23 |
| 2012/0284105 A1* | 11/2012 | Li | G06Q 30/06 705/14.23 |
| 2013/0028112 A1* | 1/2013 | Mizutani | H04L 43/106 370/252 |
| 2013/0256397 A1* | 10/2013 | Brown | G06Q 20/322 235/375 |
| 2015/0026652 A1* | 1/2015 | Pharris | G06F 30/33 716/106 |
| 2016/0357869 A1* | 12/2016 | Hang | G06F 16/248 |
| 2017/0115348 A1* | 4/2017 | Schelle | G01R 31/31703 |

* cited by examiner

FIG. 8

TRANSACTION ASSOCIATIONS IN WAVEFORM DISPLAYS

TECHNICAL FIELD

This specification relates to waveform displays.

BACKGROUND

Waveform display systems are computer systems that can be used to generate waveform display user interfaces that illustrate how electrical activities in a hardware system change over time. Waveform displays are commonly used to illustrate how simulated or actual hardware electrical signals behave in an integrated circuit or another hardware device.

Waveform displays can be used to illustrate low-level hardware events as well as higher-level events. For example, a waveform display can illustrate an occurrence of one hardware component writing data to another hardware component. At the hardware level, the actual writing operations can require multiple back-and-forth electrical signals that are exchanged between the hardware components, possibly on multiple channels, according to a particular communications protocol.

In this specification, a transaction is data that represents an activity occurring at a particular level of a hardware or a software system. Each transaction is associated with a start time and an end time. Thus, a transaction can represent a low-level electrical signal or a higher-level activity in the system, e.g., the occurrence of data being written from one component to another.

A waveform display system can represent related activities in a system as a sequence of transactions. In this specification, a signal, when used without any modifiers, refers to data representing a sequence of such transactions. Thus, a signal can include data representing higher-level transactions in a hardware system as well as data representing lower-level transactions, e.g., activity of electrical signals.

Waveform displays typically operate by consuming event files generated by a host application in an underlying testing or development system. Each event file specifies, for each of one or more signals, a sequence of transactions, with each transaction having a start time and an end time, as well as possibly other data associated with the transaction. As one example, an event file can be a waveform database file.

An event file can include information about transactions that are associated with one another. For example, a protocol analyzer can read an event file and can augment the event file with one or more transactions that represents the higher-level activities of writing data from one component to another.

One challenge users face with waveform displays is in identifying related transactions. For example, a user often wants to know what transactions were the cause of another transaction. The problem becomes even harder when a waveform display simultaneously illustrates many transactions occurring in a complex hardware system.

SUMMARY

This specification describes how a system can use event file data to store information representing transaction associations between transactions identified by a host application. This specification also describes techniques for processing the event file data into data structures that allow for efficient searching of forward and backward associations for any selected transaction.

In general, one innovative aspect of the subject matter described in this specification can be embodied in methods that include the actions of receiving data representing a main signal for the selected transaction, the main signal including a plurality of main signal events; searching data representing one or more side signals associated with the main signal for the selected transaction, each side signal including a plurality of side signal events representing other transactions that are associated with the main signal at a time indicated by a corresponding main signal event; and generating, within the waveform display, a visual indication of an association between the selected transaction and one or more transactions identified by the one or more side signals associated with the main signal for the selected transaction. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. The data representing the main signal represents one or more electrical signals or signals from a hardware design language simulation. Each signal event is a time/value pair, with the time representing a start time of the event. Each side signal event stores one or more elements, each element representing a destination transaction for the selected transaction. Each side signal of the one or more side signals represents a respective destination transaction for the selected transaction. A count signal includes data representing, for each time period of a plurality of time periods, a number of side signals having associated transactions during the time period. The actions include searching for backward associations from the selected transaction; and generating, within the waveform display, a visual indication of an association between the selected transaction and one or more transactions that have backward associations from the selected transaction. Searching for backward associations from the selected transaction comprises searching an association back map that stores mappings between respective main signal identifiers and respective event maps, each event map identifying, for a particular destination signal, one or more source signal identifiers. The visual indication of the association is an arrow, a line, different coloring, highlighting. Generating the visual indication comprises generating a line or an arrow with two separately selectable portions. The actions include receiving an indication of a user selecting a particular selectable portion of the arrow; and in response, generating, within the waveform display, a presentation of information regarding a transaction on an opposite end of the selected portion of the arrow.

Particular embodiments of the subject matter described in this specification can be implemented so as to realize one or more of the following advantages. Storing transaction association information in event files makes a system more flexible, more robust, and more compatible with legacy systems. The techniques described below allow for a waveform display system to quickly and efficiently search for forward and backward associations for any particular transaction, even in environments in which the data is continuously generated indefinitely. The techniques below may require no additional storage mechanism beyond that which captures the transaction, and possibly other time-varying data.

These mechanisms effectively filter the number of transaction associations displayed in the waveform display. In particular, the searching techniques ensure that the complexity of displaying the waveform display is linear with the connectivity of a particular transaction rather than depending on the total number of associations that the host application has identified. Displaying associated transactions in a waveform display also makes the display more intuitive and easy to understand.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for generating and displaying transaction associations, or for brevity, associations, in a waveform display. The techniques described below can be realized by modifying an events file to be consumed by a waveform display system, as well as modifying the functionality of the waveform display program to make use of this data. This allows the data needed for displaying transaction associations to be stored in the events file itself, which keeps the events file compatible with other components of the system, e.g., protocol analyzers. Although the examples below relate to processing data that is common in hardware design systems, the same techniques can also be applied to visualizations for any problem domain in which time-dependent events have relationships, such as causality, to each other.

Figure 1A:
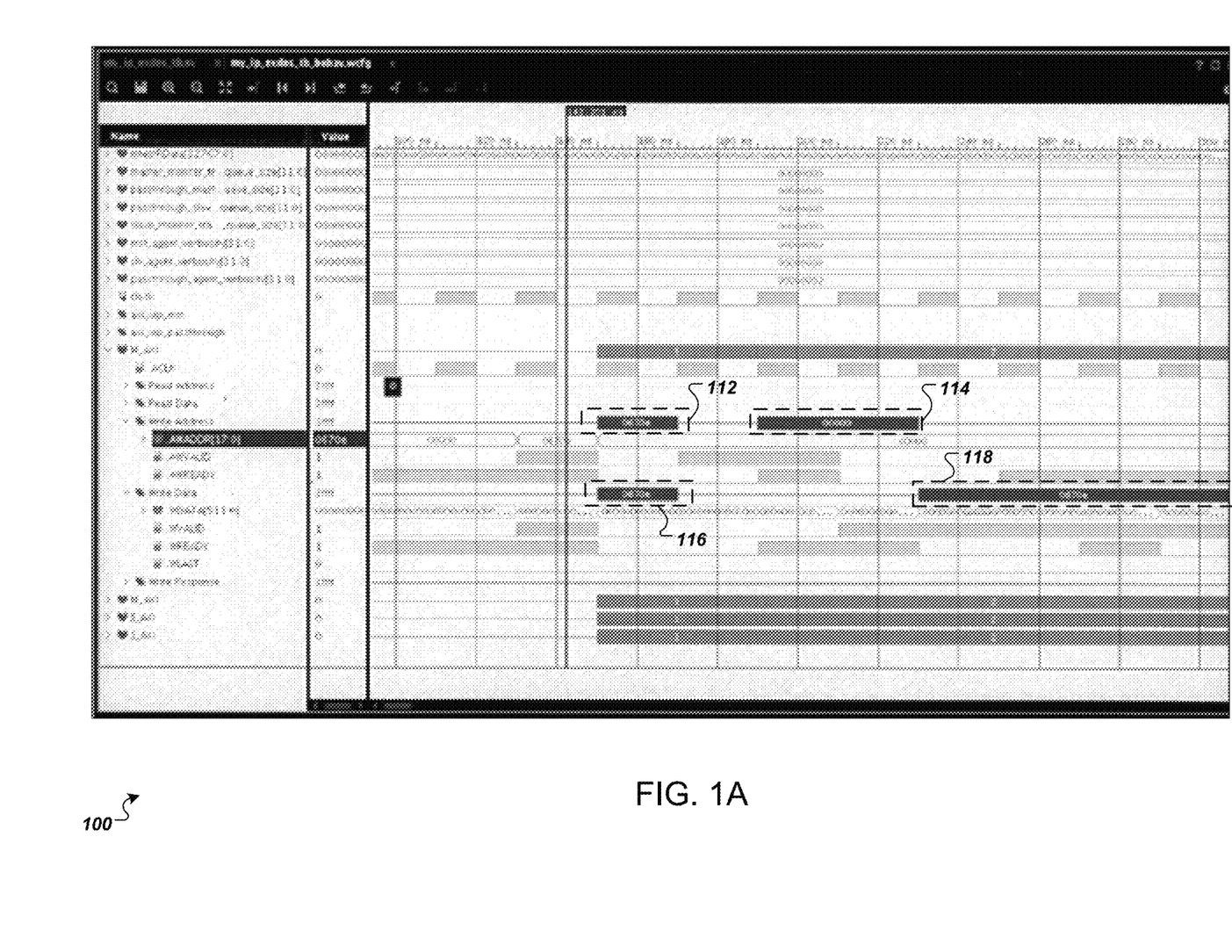
FIG. 1A illustrates an example waveform display.

FIG. 1A illustrates an example waveform display 100. In the waveform display 100, the x-axis represents time, and each row displays transactions belonging to a respective signal.

The waveform display 100 illustrates four transactions 112, 114, 116, and 118 that belong respective to one of two signals: a write address signal, having the transactions 112 and 114; and a write data signal, having the transactions 116 and 118.

Figure 1B:
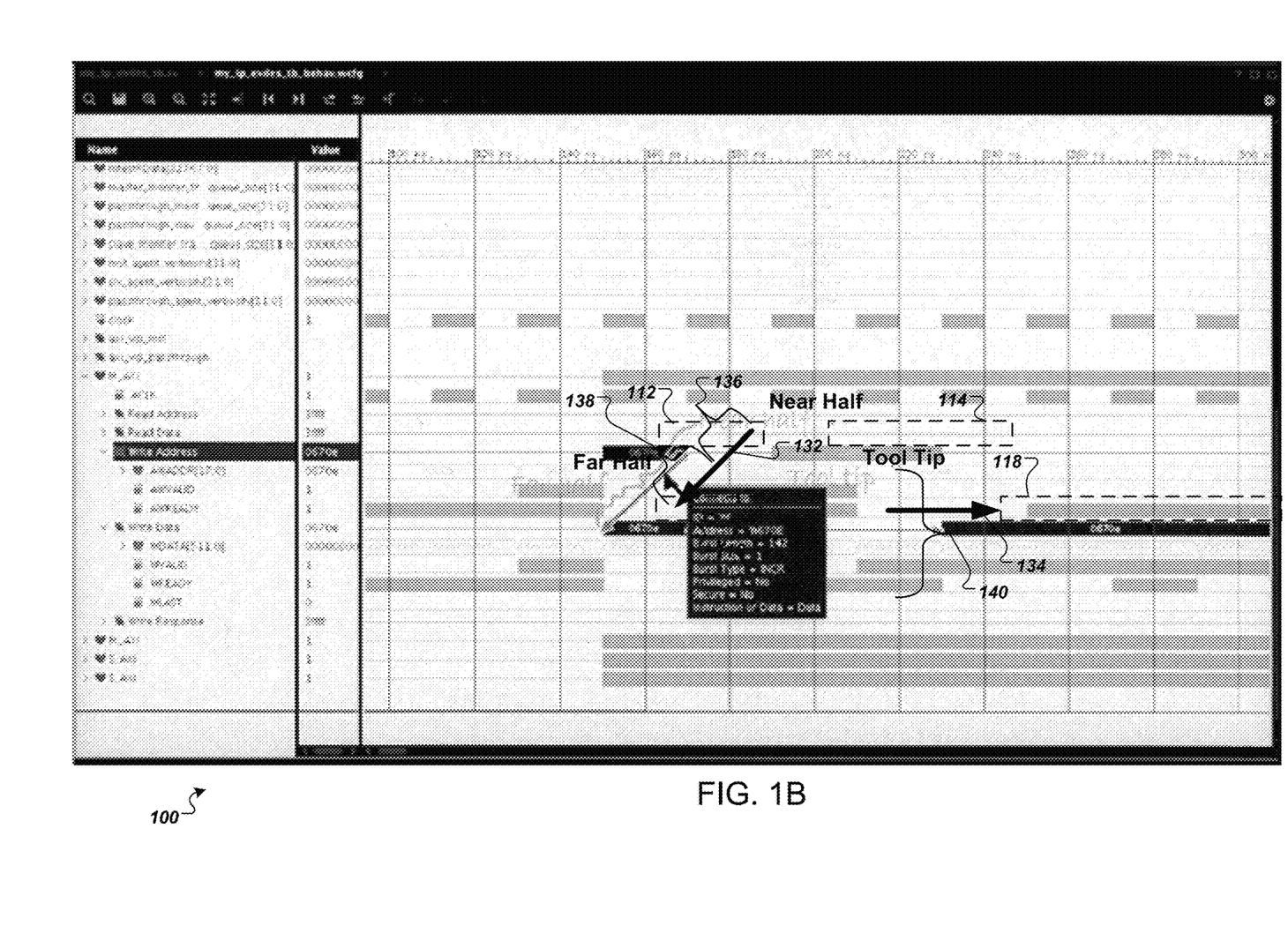
FIG. 1B illustrates a waveform display that includes a visual indication of an association network.

FIG. 1B illustrates a waveform display 100 that includes a visual indication of an association network. When a user selects, e.g., uses a mouse to click on, a transaction, the waveform display 100 can also visually distinguish the selected transaction from other transactions, for example, by applying highlighting. In this example, the visual indication includes display the associated transactions in a darker color, as well as connecting them with arrows 132 and 134.

For the selected transaction, the waveform display system can conduct a search among all the transaction associations in the events file to determine the transaction's association network. In this specification, an association network is a subset of transaction associations that connect a selected transaction, directly or indirectly, to other transactions, as well as the transactions they connect. An example technique for computing the association network is described in more detail below with reference to FIG. 7. Other transactions in the association network of a selected transaction can be visually distinguished from the selected transaction, other transactions outside the association network, or both. In addition, all the associations of the association network can be displayed in the waveform display 100.

In this example, the user has selected the transaction 112. As a result, the waveform display system searches the event file for the association network of the transaction 112. In this case, the association network includes the transactions 116 and 118, but does not include the transaction 114. The association network is visually indicated in the waveform display with arrows 132 and 134.

To enhance the visibility of all components of the association network, the waveform display can deemphasize other components of the display, e.g., by dimming or by re-drawing other transactions in a neutral color. De-selecting the selected transaction, e.g., by clicking outside of any component of the association network, causes the transaction's associations to disappear, the association network transactions to lose their visual distinctiveness, and the original color to return to the rest of the waveform display.

Displayed association indicators can have interactive behavior that depends on a location on the association indicator that the user interacts with. In this example, where the association indicator is an arrow, the arrow has of two halves: a near half 136 and a far half 138.

The near half 136 is the half of the arrow that is nearest to the user's selection location or hover location. In other words, when the mouse is hovered, e.g., left stationary, over the near half 136, the waveform viewer displays transaction information in a tool tip 140 for the transaction connected to the far half 138, as illustrated in in FIG. 1B. Unlike the tool tip displayed when hovering over a transaction, the association tool tip can display a "connects to" header to distinguish the association tool tip from a transaction tool tip. Beyond the "connects to" header in the tool tip 140, the contents of the tool tip 140 are specific to the nature of the transaction but may also contain information regarding the relationship between the two transactions at the ends of the association.

In some implementations, when the user selects the near half 136 of the arrow, the waveform display deselects the selected transaction and selects the transaction at the far half 138, shifting the display if necessary to ensure that the newly selected transaction is visible in the window. The change in selection is accompanied by a change in the association network, as if the newly selected transaction were selected by the user.

Alternative formats of waveform displays are also within the scope of the techniques described in this specification. As another example, the waveform display can be presented in a textual list view, with transactions presented in a spreadsheet format, with each event occupying one row. Each row can contain a description of the event, start and end times, and other associated data. In this format, associations can be represented as one or more extra columns including the row number of the far end of the association.

Figure 2:
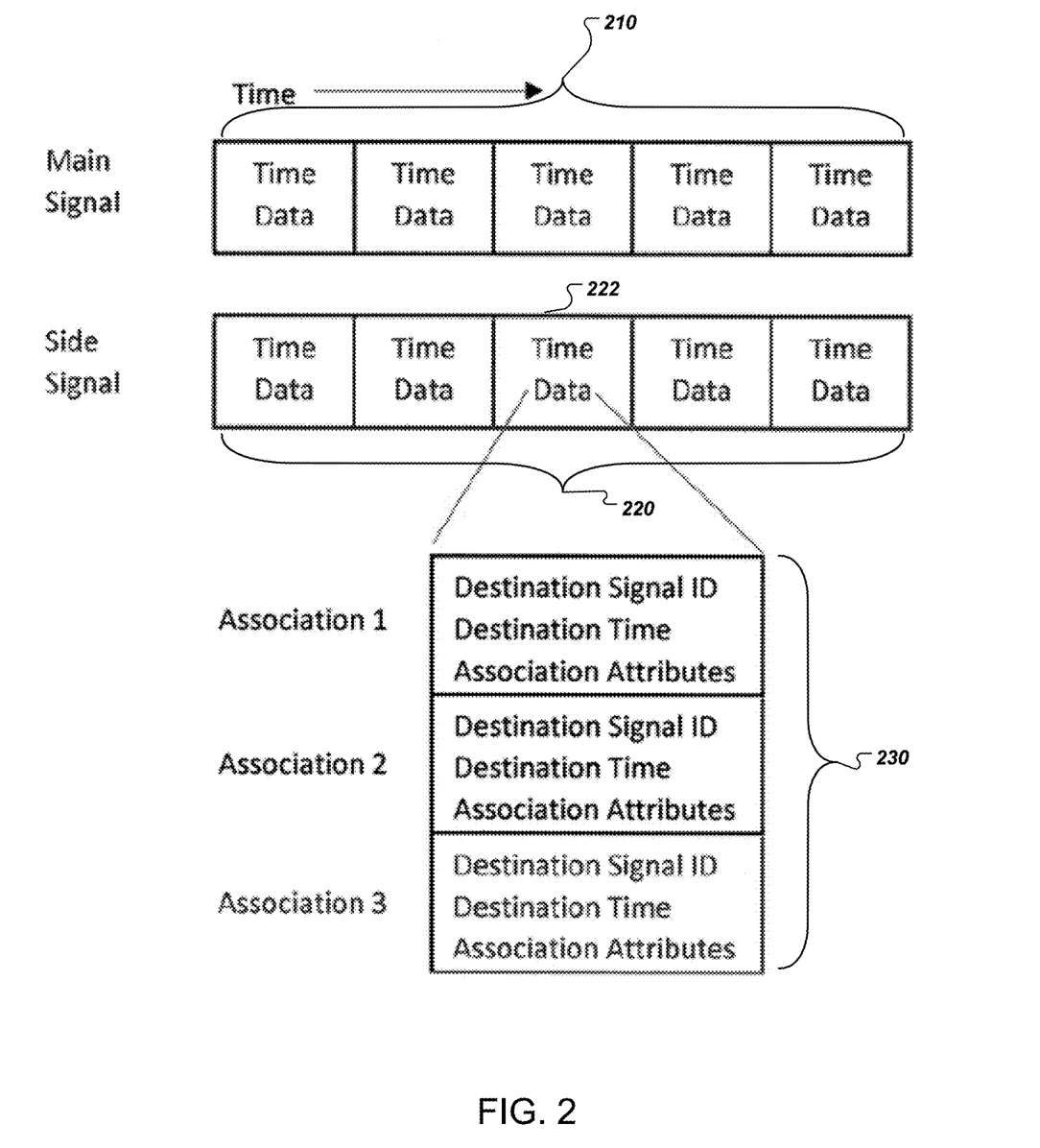
FIG. 2 illustrates an example technique for storing transaction associations within an event file.

FIG. 2 illustrates an example technique for storing transaction associations within an event file. Underlying the visible behavior of transaction associations is a data storage infrastructure for associations and transactions. To the storage infrastructure, a signal is stored as a sequence of events, each event being a time/value pair, and with events in a signal being stored in increasing time order.

An example of a signal stored in the event file is the output of a hardware description language (HDL) simulator for a representation of a single HDL control signal. A signal can be identified with an integral ID, a unique text name, or both.

A transaction descriptor is a signal/time pair, where the time matches one of the times of the signal's stored events. In this context, matching a time can include an exact match or time values that are within a threshold time window. This transaction descriptor indicates the starting time of the transaction. The ending time of the transaction can be interpreted to be the next event in the signal's event list.

The host application can specify associations by creating extra signals, which in this specification will be referred to as side signals, that are paired with signals having transaction data. To distinguish side signals, the primary signals having transaction data will be referred to as main signals.

The waveform display system does not typically include the side signals in the waveform display, unlike the main signals, which each occupy a row in the waveform display. The host application can create the side signal events to represent each transaction association.

A side signal event corresponds with a main signal event, although the side signal event need not be coincidental to the main signal event. In other words, if there is no side signal event matching the transaction time, the waveform display system can interpret the side signal event that precedes the transaction time as corresponding to the transaction event.

The combination of main signal and event time defines a source end of a transaction association. The value of the corresponding side signal event indicates all other aspects of the transaction association, including a destination end that identifies the associated transaction, as well as possibly other attributes, e.g., display styles or other association metadata.

The source ends and destination ends of a transaction association between two transactions define the links in the transaction association graph. As described above, the waveform display system can traverse the transaction association graph to determine which transaction associations to display. This process is described in more detail below with reference to FIG. 7.

There are multiple possible formats for storing transaction association data in a side signal event. One possibility is a single structure for the value part of the side signal event, as shown in FIG. 2.

FIG. 2 illustrates a main signal 210 having a sequence of main signal events and a corresponding side signal 220 having a sequence of side signal events.

The event data for any of the side signal events can be an array having one or more elements. In FIG. 2, for example, the side signal event 222 stores data that includes a three-element array 230. Each element of the array 230 represents a particular transaction association for a transaction of the main signal.

Figure 3:
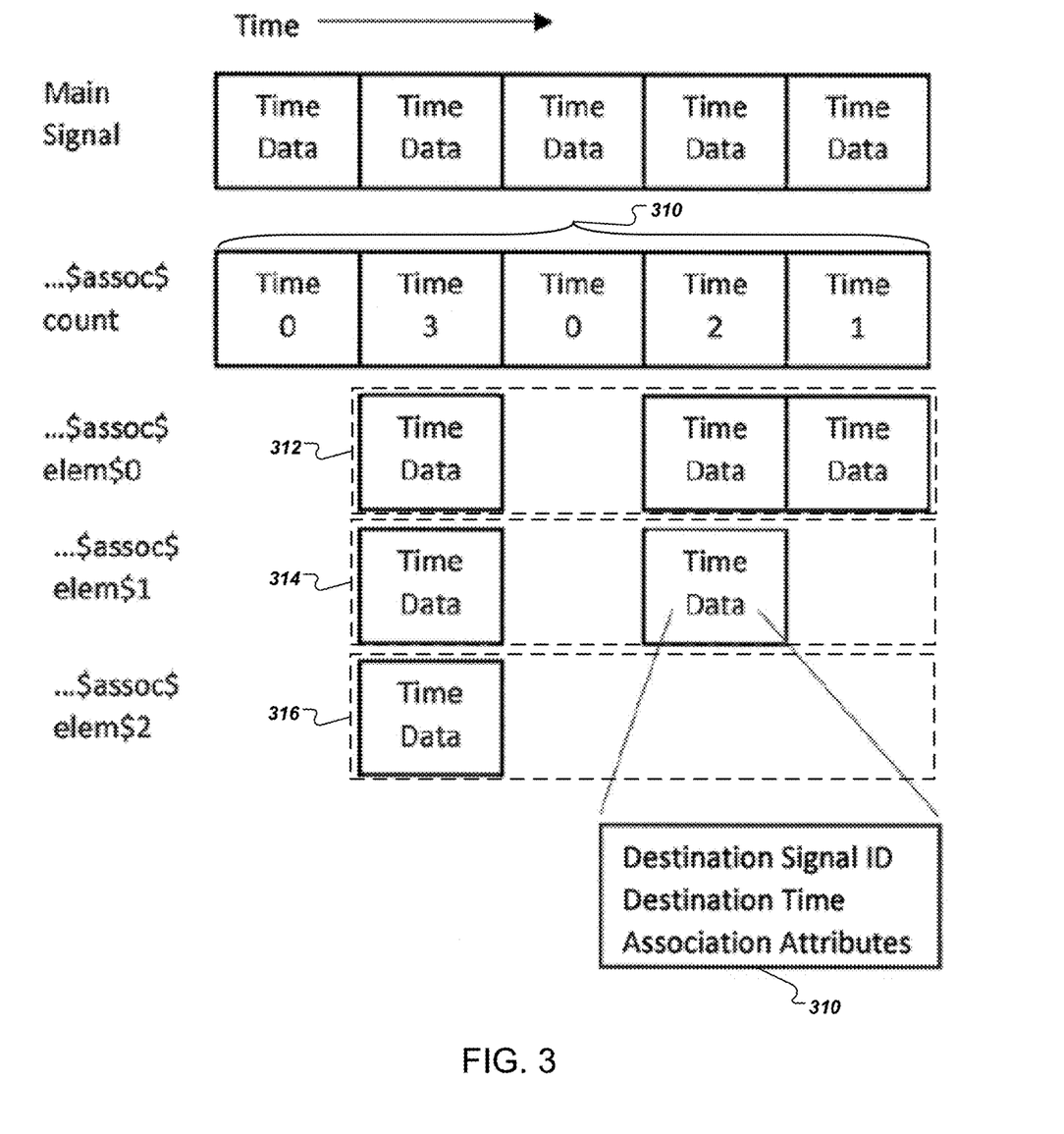
FIG. 3 illustrates a structure for storing transaction association data.

FIG. 3 illustrates an alternative structure for storing transaction association data. In FIG. 3, the association data is stored using multiple correlated side signals: a count side signal 310 and one or more element side signals 312, 314, and 316, one association side signal for each transaction association.

In FIG. 3, the multiple side signals are correlated by their name endings. The count side signal 310 stores events whose data indicates the number of associations for any particular main signal event. The count side signal 310 may have a name that ends in "$assoc$count", for example. Each event of the count side signal 310 stores a count value from 0 to the maximum possible number of associations, which is a value that is defined by the host application, on a transaction of the main signal. There is also an additional element side signal per possible association. The element side signals may have names that end in "$assoc$elem$<n>" where <n> is an integer from 0 to the maximum-1. Thus, for example, if a transaction of main signal a "abc" can have at most 4 associations emanating from it, there would be a count side signal named "abc$assoc$count" and element side signals "abc$assoc$elem$0" through "abc$assoc$elem$3".

The side signals for a main signal can be found by forming their names based on the name of the main signal and then searching the design for any side signals by name. An alternative approach would be to store the side signal names as a property of the main signal. Each element side signal contains events for one association of a transaction.

In addition to the signal ID and time of the transactions at the destination end of each association, FIGS. 2 and 3 also show a field named "association attributes" contained within the data of each side signal event. These attributes include data for whether the source and destination ends have arrowheads, and whether the source and destination ends connect to their transactions' start time, e.g., srcFinish/destFinish=false, or finish time, e.g., srcFinish/destFinish=true.

FIGS. 2-3 are merely examples of how the transaction association data can be stored in the side signals. In some implementations, the transaction association data can be included within the data of the main signal events.

Figure 4:
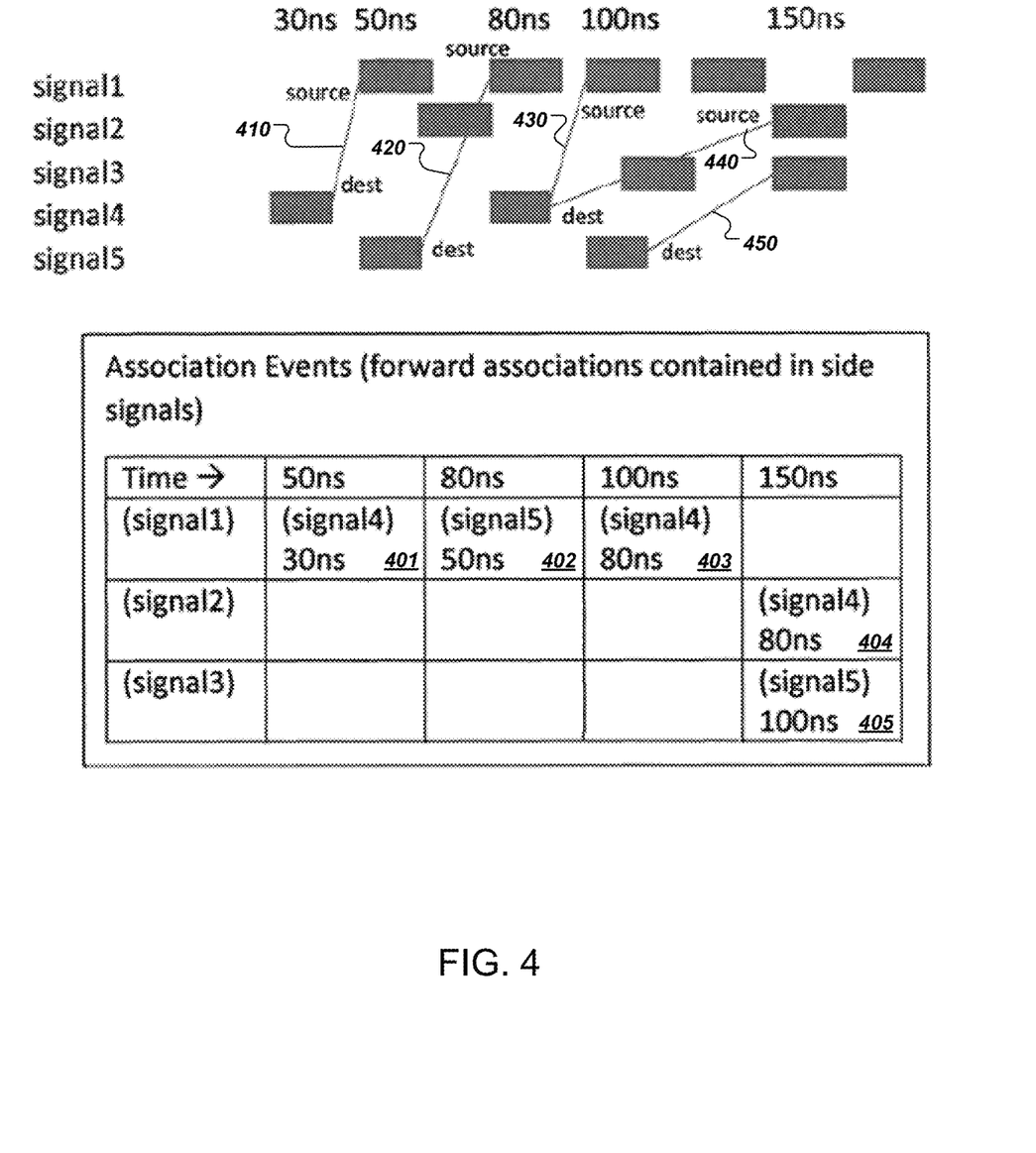
FIG. 4 illustrates an example of how data in side signals can represent associations in a transaction association graph.

FIG. 4 illustrates an example of how data in side signals can represent associations in a transaction association graph. A waveform display system can search for side signal events to generate transaction associations for a waveform display.

At 50 ns, signal1 has a side signal event 401 that includes a destination signal id, signal4, and a destination time of 30 ns. This data represents a link 410 in the transaction association graph having a source transaction of signal1 and a destination transaction of signal4. Therefore, the waveform display system can present an indication of the association from signal1 at 50 ns to signal4 at 30 ns.

In contrast, at 50 ns the system finds no side signal events for signal2 and signal3 and thus no links are generated.

At 80 ns, signal1 has a side signal event 402 that includes a destination signal id, signal5, and a destination time of 50 ns. This data represents a link 420 in the transaction association graph having a source transaction of signal1 and a destination transaction of signal5. Similarly, at 100 ns, signal1 has a side signal event 403 that includes a destination signal id, signal4, and a destination time of 80 ns. This data represents a link 430 in the transaction association graph having a source transaction of signal1 and a destination transaction of signal4. Meanwhile, the system finds no side signal events for signal2 or signal3 at 80 ns or at 100 ns.

At 150 ns, signal1 has no associated side signal events. Meanwhile, signal2 has a side signal event 404 that includes a destination signal id, signal4, and a destination time of 80 ns. Similarly, signal3 has a side signal event 405 that includes a destination signal id, signal5, and a destination time of 100 ns. The waveform display system can use these transaction associations to generate links in the transaction association graph, to display visual indications of the transaction associations in a waveform display, or both.

Figure 5:
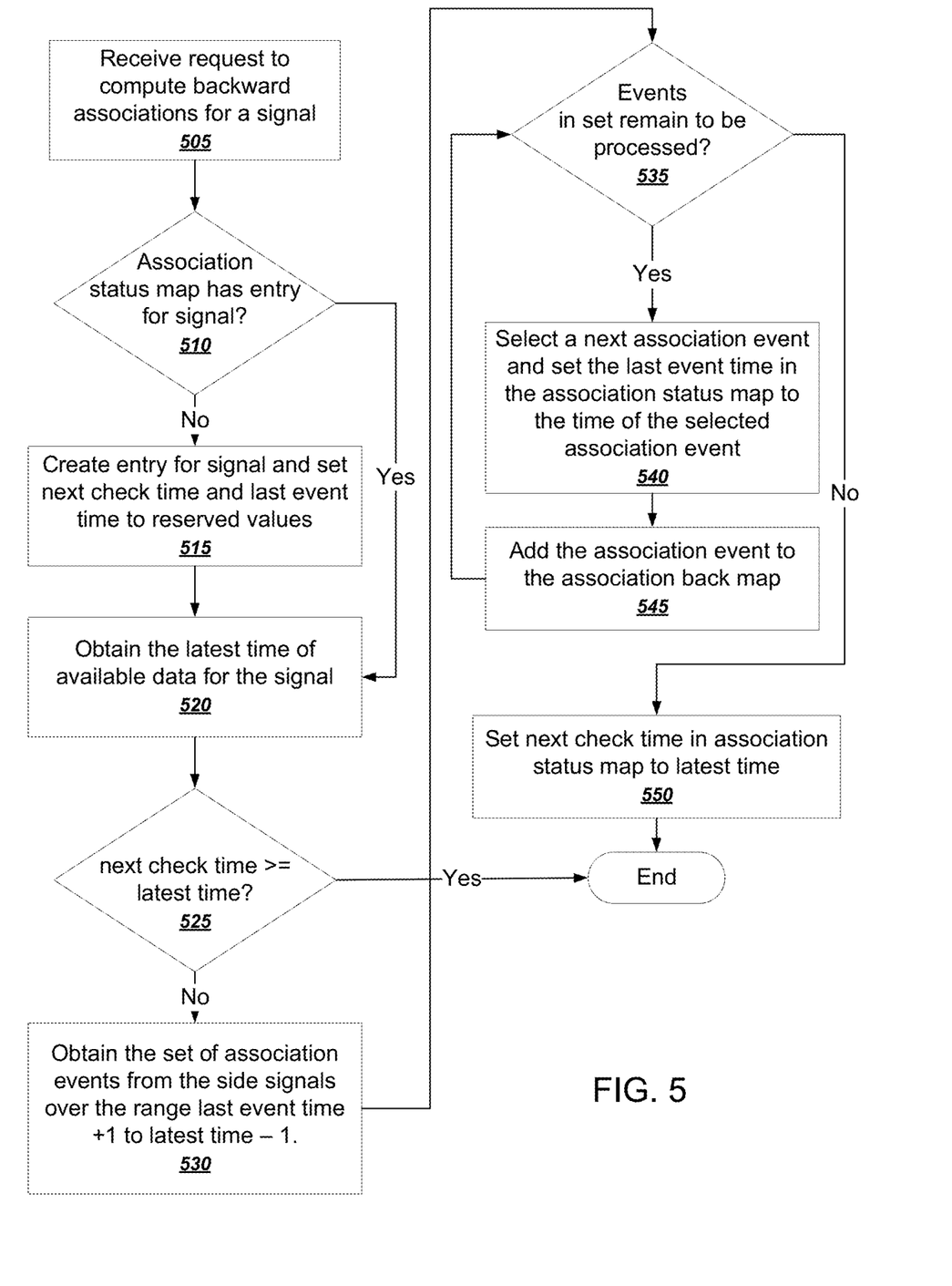
FIG. 5 is a flowchart of an example process for building an association back map that allows efficient searching backward in an association graph.

FIG. 5 is a flowchart of an example process for building an association back map that allows efficient searching backward in an association graph. FIG. 4 illustrated forward searching, which can be done directly from the signal events themselves by simply checking for whether a main signal event had an associated side signal event. Such associations may be referred to as forward associations. To search for associations in the opposite direction, a waveform display system can build an association back map that allows for backward searching. For convenience, the process will be described as being performed by a system of one or more computers, located in one or more locations, and programmed appropriately in accordance with this specification. For example, a waveform display system, appropriately programmed, can perform the example process.

The system receives a request to compute backward associations for a signal (505). The signal can be any appropriate signal represented in an events file. For example, the system can iterate over all main signals in an events file and perform the example process for each one in order to populate the back map. In some implementations, the system limits the process to only signals that have source transactions, e.g., by virtue of having side signals.

The request can also be triggered by a determination that a signal is new, e.g., the user has just added the signal to the waveform display, or that the signal is out of date. For example, the techniques for building the association back map can also be used as part of a live simulation process in which the signal data is constantly being updated. In that environment, the request can indicate a need to build an association back map for an updated or newly added signal as a result of the ongoing simulation.

The system determines whether an association status map has an entry for the signal (510). An association status map is a mapping between a signal and two associated times: a last event time and a next check time.

Figure 6:
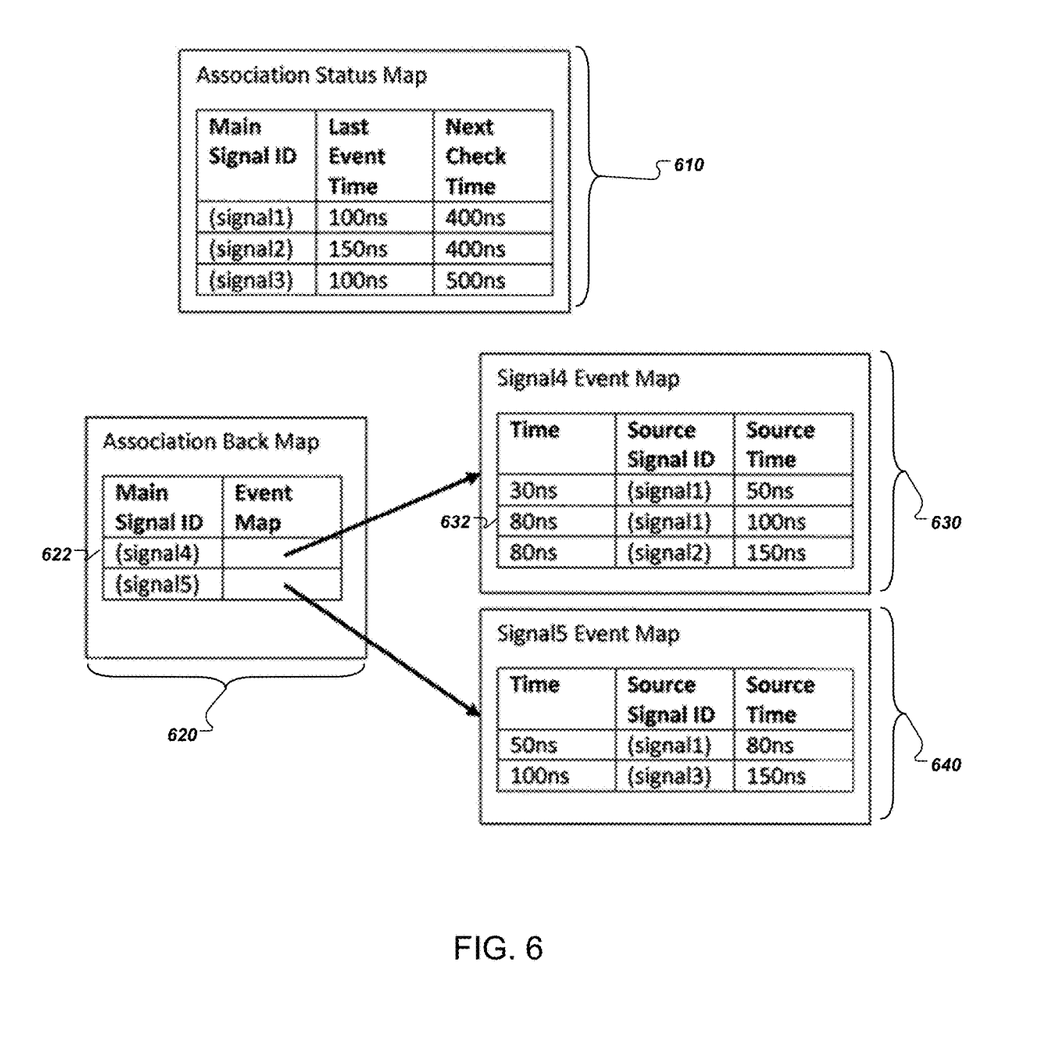
FIG. 6 illustrates an association status map, an association back map, and associated event maps.

FIG. 6 illustrates an association status map 610. Each tuple in the association status map includes a main signal id, a last event time, and a next check time. The uses of these data elements is described in more detail below. The association status map 610 can be implemented using any appropriate mapping technique, e.g., as an in-memory database or as a relational database.

As shown in FIG. 5, if the association status map has no entry for the signal, the system creates an entry for the signal and sets the next check time and the last event time for the signal to a reserved value (branch to 515). The reserved value is simply a marker that indicates that the values have not yet been set. The system can use any appropriate value for the reserved value, e.g., 0, −1, or null, to name just a few examples.

The system obtains the latest time of available data for the signal (520). In some contexts, e.g., when processing only previously generated data, all the data is already available when building the association back map. Therefore, the latest time of available data for the signal corresponds to the latest time of available data for the entire data set in the event file.

However, in some contexts, e.g., for an ongoing simulation, the event data can be arriving intermittently or continuously for an extended time period. Therefore, the check in step 520 determines what time value corresponds to the latest event data that has arrived for the signal. This allows the waveform display to present data to the user before the simulation is complete, which is a very useful feature for simulations that run for extended time periods, e.g., hours at a time.

The system determines whether the next check time for the signal is greater than or equal to the latest time (525). This check essentially determines whether or not the data at the latest time has already been processed. If so, the process ends (branch to end).

If not, then there is additional data to be processed, so the system obtains the set of association events from the side signals in time-sorted order of the time range last event time+1 to latest time −1 (branch to 530). In other words, the system searches the side signals of the signal for any association events that fall within the specified time range. The system then generates a set of all association events matching the specified time range.

As a concrete example, if the system is processing signal1 in the association status map 610, the system can evaluate the association events 401, 402, and 403 for signal1 illustrated in FIG. 4. In this example, last event time+1 is 101 ns and latest time −1 is 149 ns. Only the association event 403 matches the specified time range.

The system determines whether any association events in the set remain to be processed (535). In other words, the system can continue to iterate over all association events found in the specified time range.

If one or more events remain to be processed, the system selects a next association event and sets the last event time in the association status map to the time of the selected association event (branch to 540). In the running example, the association event 403 had a time of 100 ns, and therefore, the system can update the association status map 610 for signal1 with the value 100 ns.

The system adds the association event to the association back map (545). Adding the association event to the association back map can first include creating or updating an entry for the signal specified in the association event. In the running example, the association event 403 specified signal4. Therefore, the system can add the entry 622 into the association back map 620 if it did not already exist. The association back map can be implemented using any appropriate mapping technique, e.g., as an in-memory database or as a relational database.

The system can then update the entry 622 by adding or updating an event map for the referenced signal. The event map 630 is stored in the association back map 620 in association with signal4. As shown, the event map 630 for signal4 includes three entries, which each identify a respective source signal id of a corresponding transaction association, as well as a source time of the source signal. In the running example, the system can add or update an entry 632 into the event map 630 for signal4 that represents the transaction association from signal1 to signal4 at time 100 ns.

Signal5 similarly has an associated event map 640 that is stored in association with signals in the association back map 620.

If no association events in the set remain to be processed (535), the system sets the next check time in the association status map to the latest time (branch to 550) and the process ends.

After generating the association back map, the waveform display system has data structures in place to efficiently search forward or backward in an transaction association graph.

FIG. 6 illustrated data structures that would be typical for an in-memory implementation. As mentioned above, however, the same data can also be stored in a relational database. As one example, a relational database can have a single table with all data from the entries 622 and 632 included in a single row.

Some alternative implementations may omit the status map 610 entirely, which primarily is used for efficiency purposes and is not strictly necessary. An alternate implementation could, for example, scan the event file data from time 0 to an end time, e.g., periodically or upon a certain triggering condition, such as a simulation end. Alternatively or in addition, the status map data could be stored as extra fields of the association back map 620.

Figure 7:
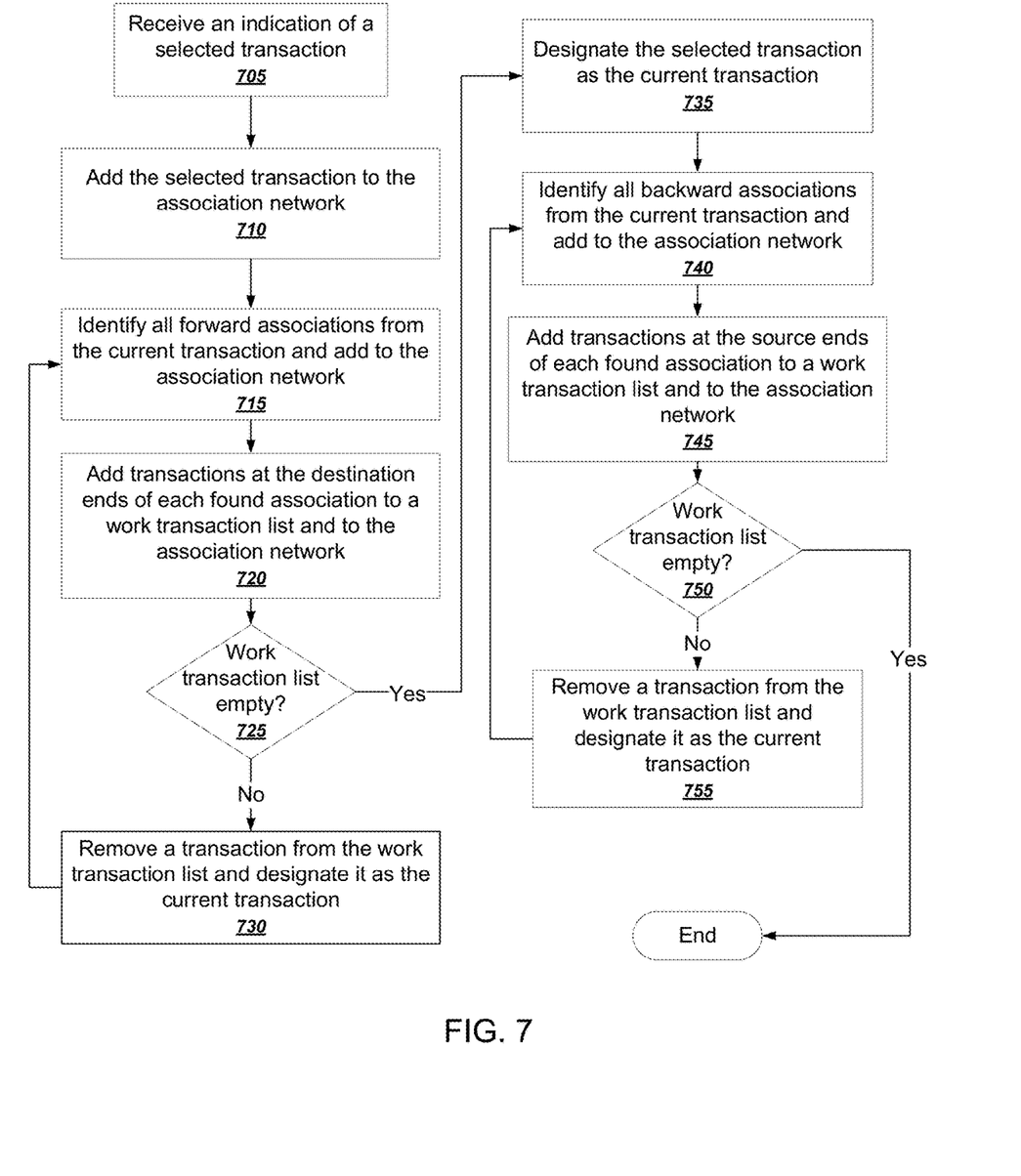
FIG. 7 is a flowchart of an example process for generating an association network for a transaction.

FIG. 7 is a flowchart of an example process for generating an association network for a transaction. In general, the association network for a transaction can be used to limit the amount of transaction associations that are rendered within a waveform display. For convenience, the process will be described as being performed by a system of one or more computers, located in one or more locations, and programmed appropriately in accordance with this specification. For example, a waveform display system, appropriately programmed, can perform the example process.

The system receives an indication of a selected transaction (705). In other words, the system has presented a waveform display to a user and a user has selected, within the waveform display, a particular transaction belonging to a particular signal.

The system designates the selected transaction as a current transaction and adds the selected transaction to the association network (710). In general, the example process can maintain a pointer to a current transaction and walk a transaction association graph of all the possible transaction associations. In the transaction association graph, the vertices are transactions and the transaction associations are the edges. The association network can then be used to generate a set of visual transaction association indicators, e.g., arrows, that are shown in the waveform display.

The system identifies all forward associations from the current transaction and adds the associations to the association network (715). In other words, the system searches one step forward in the transaction association network and adds the links to the graph. As described above, the system can search forward in the network by searching the side signals associated with the current transaction.

The system adds transactions at the destination ends of each found association to a work transaction list and to an association network (720). The work transaction list is a list of nodes that have to be further processed later in the process.

The system determines whether the work transaction list is empty (725). If not, the system removes a transaction from the work transaction list and designates the removed transaction as the current transaction (branch to 730). The system then again searches one step forward in the association network from the current transaction (715).

If the work transaction list is empty (725), the system then searches the backward associations from the selected transaction, e.g., using the association back map described above. To do so, the system designates the selected transaction as the current transaction (branch to 735).

The system identifies all backward associations from the current transaction and adds the associations to the association network (740). For example, the system can search using the association back map structure described above.

The system adds transactions at the source ends of each found association to a work transaction list and to the association network (745).

As described above, the work transaction list is a set of transactions that have yet to be processed for links.

The system determines whether the work transaction list is empty (750). If not, the system removes a transaction from the work transaction list and designates the removed transaction as the current transaction (branch to 755). The system can then search again from backward associations from the current transaction (740).

If the work transaction list is empty (750), the process ends (branch to end).

As can be seen from FIG. 7, the example process performs a forward stage in which forward associations from the selected transaction are found, as well as a backward stage in which backward associations from the selected transaction are found. One or both of these stages can be implemented using recursive techniques. During each respective stage, the system can elect to search in only one direction to prevent a propagation explosion. In other words, after search forward for transactions, the system may omit a backward search for associated transactions from that point.

Alternate approaches for filtering the association network are also possible. For example, instead of searching only one direction as described in FIG. 7, the search can recursively follow all paths forward and backward but can be limited by an overall distance from the selected transaction.

Figure 8:
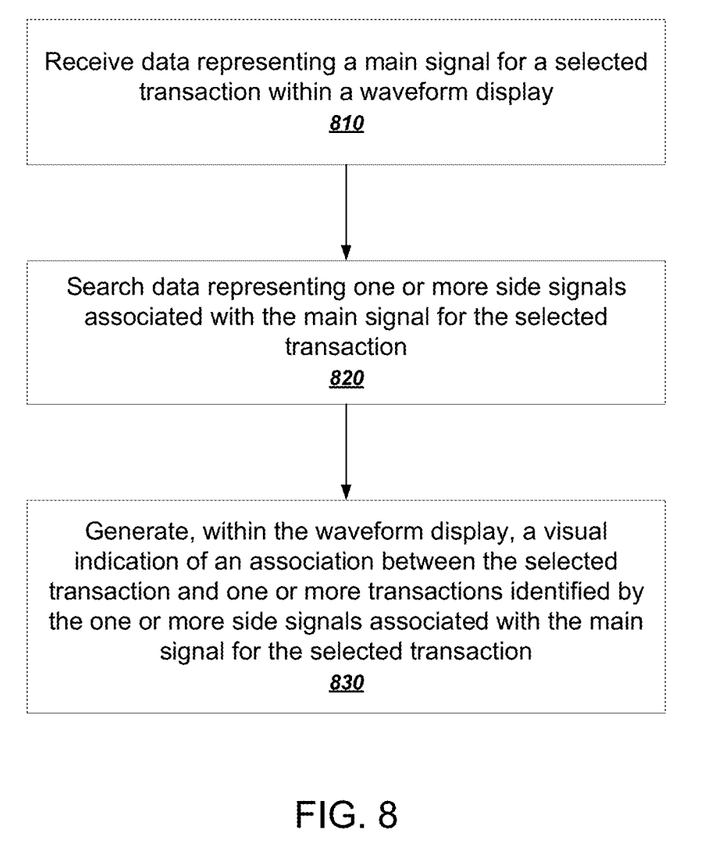
FIG. 8 is a flowchart of an example process for generating a waveform display that presents transaction associations for a selected transaction.

FIG. 8 is a flowchart of an example process for generating a waveform display that presents transaction associations for a selected transaction. For convenience, the process will be described as being performed by a system of one or more computers, located in one or more locations, and programmed appropriately in accordance with this specification. For example, a waveform display system, appropriately programmed, can perform the example process.

The system receives data representing a main signal for the selected transaction (810). As described above, the main signal can include a sequence of main signal events.

The system searches data representing one or more side signals associated with the main signal for the selected transaction (820). For example, the system can perform a forward search by identifying side signals that correspond to a time of the selected transaction. The system can alternatively or in addition perform a backward search for backward associations from the selected transaction.

The system generates, within the waveform display, a visual indication of an association between the selected transaction and one or more transactions identified by the one or more side signals associated with the main signal for the selected transaction (830). After generating the visual representation of the transaction, the waveform display system can present the waveform display. As illustrated in FIG. 1B, the visual indication can be an arrow, although other visual indicators are also possible. For example, the visual indication can be a line, different coloring, or highlighting.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method of displaying transactions associated with a selected transaction in a waveform display, the method comprising:
   storing, within an event file, data representing a main signal, the main signal including transaction data and including a plurality of main signal events, wherein the transaction data represents activity occurring in a hardware or a software system;
   storing, within the event file, data representing one or more side signals associated with the main signal, each side signal including transaction association data having a plurality of side signal events representing transactions of other signals that are associated with the main signal at a time indicated by a corresponding main signal event;
   determining, for the selected transaction, a selected side signal event from the one or more side signals of the event file, the selected side signal event specifying a transaction association of the selected transaction to a related transaction occurring on one of the other signals, wherein the main signal and the one or more side signals including the selected side signal event comprise an address signal and a data signal; and
   generating, within the waveform display, a visual indication of the transaction association between the selected transaction and the related transaction, wherein the selected side signal event of the event file includes one or more attributes defining how the visual indication is displayed in the waveform display, wherein the related transaction is identified by the one or more side signals associated with the main signal for the selected transaction; and
   wherein the visual indication of the association includes a line or an arrow having two separately selectable portions, wherein selection of each portion initiates a display of different information relating to the selected transaction.

2. The method of claim 1, comprising:
   determining a time for the selected transaction and searching, within the event file, the data representing the one or more side signals for the selected side signal event by searching for a side signal event having a time corresponding to a time of the selected transaction; and
   determining, from the selected side signal event, the transaction association, wherein the transaction association specifies the related transaction.

3. The method of claim 1, wherein the line or the arrow connects the selected transaction with the related transaction within the waveform display.

4. The method of claim 3, wherein the one or more attributes indicate a start time or a finish time of the selected transaction to which the line or the arrow connects and a start time or a finish time of the related transaction to which the line or the arrow connects.

5. The method of claim 1, wherein each side signal of the one or more side signals represents a respective destination transaction for the selected transaction.

6. The method of claim 5, wherein the event file stores a count signal associated with the main signal, wherein the count signal includes data representing, for each time period of a plurality of time periods of the main signal, a number of side signals having associated transactions for the main signal during the time period.

7. The method of claim 1, further comprising:
   searching for backward associations from the selected transaction; and
   generating, within the waveform display, a visual indication of an association between the selected transaction and one or more transactions that have backward associations from the selected transaction.

8. The method of claim 7, wherein the searching for backward associations from the selected transaction comprises:
   searching an association back map that stores mappings between respective main signal identifiers and respective event maps, each event map identifying, for a particular destination signal, one or more source signal identifiers.

9. The method of claim 1, further comprising:
   receiving an indication of a user selecting a particular selectable portion of the line or the arrow; and
   in response, generating, within the waveform display, a presentation of information regarding the transaction on an opposite end of the selected portion of the arrow.

10. The method of claim 9, wherein:
    the particular selectable portion of the line or the arrow is a portion nearest to the selected transaction; and
    in response to receiving the indication of the user selecting the particular selectable portion, the selected transaction is deselected and the related transaction is selected.

11. A system comprising:
    one or more computers and one or more storage devices storing instructions that are operable, when executed by the one or more computers, to cause the one or more computers to perform operations to display transactions associated with a selected transaction in a waveform display, the operations comprising:
    storing, within an event file, data representing a main signal for the selected transaction, the main signal including transaction data and including a plurality of main signal events, wherein the transaction data represents activity occurring in a hardware or a software system;
    storing, within the event file, data representing one or more side signals associated with the main signal, each side signal including transaction association data having a plurality of side signal events representing transactions of other signals that are associated with the main signal at a time indicated by a corresponding main signal event;
    determining, for the selected transaction, a selected side signal event from the one or more side signals of the event file, the selected side signal event specifying a transaction association of the selected transaction to a related transaction occurring on one of the other signals, wherein the main signal and the one or more side signals including the selected side signal event comprise an address signal and a data signal; and generating, within the waveform display, a visual indication of the transaction association between the selected transaction and the related transaction, wherein the selected side signal event of the event file includes one or more attributes defining how the visual indication is displayed in the waveform display, wherein the related transaction is identified by the one or more side signals associated with the main signal for the selected transaction; and wherein the visual indication of the association includes a line or an arrow having two separately selectable portions, wherein selection of each portion initiates a display of different information relating to the selected transaction.

12. The system of claim 11, wherein the operations comprise:

determining a time for the selected transaction and searching, within the event file, the data representing the one or more side signals for the selected side signal event by searching for a side signal event having a time corresponding to a time of the selected transaction; and determining, from the selected side signal event, the transaction association, wherein the transaction association specifies the related transaction.

13. The system of claim 11, wherein the line or the arrow connects the selected transaction with the related transaction within the waveform display.

14. The system of claim 13, wherein the one or more attributes indicate a start time or a finish time of the selected transaction to which the line or the arrow connects and a start time or a finish time of the related transaction to which the line or the arrow connects.

15. The system of claim 11, wherein each side signal of the one or more side signals represents a respective destination transaction for the selected transaction.

16. The system of claim 15, wherein the event file stores a count signal associated with the main signal, wherein the count signal includes data representing, for each time period of a plurality of time periods of the main signal, a number of side signals having associated transactions for the main signal during the time period.

17. The system of claim 11, wherein the operations further comprise:

searching for backward associations from the selected transaction; and generating, within the waveform display, a visual indication of an association between the selected transaction and one or more transactions that have backward associations from the selected transaction.

18. The system of claim 17, wherein the searching for backward associations from the selected transaction comprises:

searching an association back map that stores mappings between respective main signal identifiers and respective event maps, each event map identifying, for a particular destination signal, one or more source signal identifiers.

19. The system of claim 11, wherein the operations further comprise:

receiving an indication of a user selecting a particular selectable portion of the line or the arrow; and in response, generating, within the waveform display, a presentation of information regarding the transaction on an opposite end of the selected portion of the arrow.

20. The system of claim 19, wherein:

the particular selectable portion of the line or the arrow is a portion nearest to the selected transaction; and in response to receiving the indication of the user selecting the particular selectable portion, the selected transaction is deselected and the related transaction is selected.

* * * * *